(12) United States Patent
Bekkevold

(10) Patent No.: US 8,794,336 B2
(45) Date of Patent: Aug. 5, 2014

(54) TOOL FOR CONNECTING PIPELINES

(75) Inventor: Knut Håvard Bekkevold, Hof (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 123 days.

(21) Appl. No.: 12/735,190

(22) PCT Filed: Dec. 19, 2008

(86) PCT No.: PCT/NO2008/000465
§ 371 (c)(1),
(2), (4) Date: Sep. 17, 2010

(87) PCT Pub. No.: WO2009/082240
PCT Pub. Date: Jul. 2, 2009

(65) Prior Publication Data
US 2011/0005764 A1   Jan. 13, 2011

(30) Foreign Application Priority Data
Dec. 21, 2007   (NO) .................................. 2007 6631

(51) Int. Cl.
*E21B 7/12*   (2006.01)
*E21B 43/013*   (2006.01)
*F16L 1/26*   (2006.01)

(52) U.S. Cl.
CPC *F16L 1/26* (2013.01); *E21B 43/013* (2013.01)
USPC ........................... 166/380; 166/85.1; 166/85.5

(58) Field of Classification Search
USPC ........... 166/341–346, 360, 365; 405/169, 170
See application file for complete search history.

(56) References Cited

U.S. PATENT DOCUMENTS

| | | | |
|---|---|---|---|
| 3,578,233 A * | 5/1971 | Meister et al. | 228/5.1 |
| 4,019,334 A * | 4/1977 | Sinclair et al. | 405/169 |
| 4,075,862 A | 2/1978 | Ames | |
| 4,191,256 A | 3/1980 | Croy et al. | |
| 4,274,664 A * | 6/1981 | Thominet | 285/24 |
| 4,371,005 A * | 2/1983 | Morrill et al. | 138/89 |
| 4,525,101 A * | 6/1985 | Stevens et al. | 405/169 |
| 5,730,551 A * | 3/1998 | Skeels et al. | 405/170 |

(Continued)

FOREIGN PATENT DOCUMENTS

| | | |
|---|---|---|
| GB | 2 118 657 A | 11/1983 |
| GB | 2 382 636 A | 6/2003 |

(Continued)

*Primary Examiner* — Matthew Buck
*Assistant Examiner* — Aaron Lembo

(57) ABSTRACT

The invention concerns a tool for a tool for connecting an end of a first pipeline (22) to an end of a second pipeline (3) supported by a subsea structure (1) and being provided by at least two guide elements (11, 12). The tool comprising means for connecting the pipelines, and it comprises a receiving portion (32) provided to accommodate the end of the first pipeline in a slideable manner, and guiding means comprising at least two guiding sections (34, 35) extending from receiving portion (32). Each guiding section has an end arranged with an attachment portion (36, 37) interfacing with the guide elements (11, 12).

20 Claims, 7 Drawing Sheets

(56) References Cited

U.S. PATENT DOCUMENTS

| | | |
|---|---|---|
| 6,022,421 A | 2/2000 | Bath et al. |
| 6,142,708 A * | 11/2000 | Tarlton et al. ............... 405/170 |
| 6,234,717 B1 * | 5/2001 | Corbetta ...................... 405/170 |
| 6,503,021 B2 * | 1/2003 | Corbetta ...................... 405/170 |
| 6,997,645 B2 * | 2/2006 | von Trepka et al. .......... 405/170 |
| 7,402,000 B2 * | 7/2008 | Bastesen et al. .............. 405/170 |
| 7,467,662 B2 * | 12/2008 | Smith ........................... 166/343 |
| 7,503,727 B2 * | 3/2009 | Ingebretsen et al. .......... 405/169 |
| 8,057,126 B2 * | 11/2011 | Mogedal et al. .............. 405/170 |

FOREIGN PATENT DOCUMENTS

| | | |
|---|---|---|
| NO | 319639 B1 | 9/2005 |
| WO | WO 01/79736 A1 | 10/2001 |
| WO | WO 2006/005994 A1 | 1/2006 |
| WO | WO 2008/012134 A1 | 1/2008 |

\* cited by examiner

TOOL FOR CONNECTING PIPELINES

BACKGROUND OF THE INVENTION

The invention concerns a tool for connecting an end of a first pipeline to an end of a second pipeline supported by a subsea structure and being provided by at least two guide elements. Further, the invention also concerns a method for connecting the ends of first and second pipeline, wherein the second pipeline is supported by a subsea structure and being provided by at least two guide elements, and a tool comprising means for connecting the pipeline ends.

Subsea installations for oil and gas extraction are commonly connected together by pipes, commonly called pipeline (or flowline) spools. The connection may for example be between a well and a manifold, or flowline (having a T-junction), or between template systems. In this case a length of pipe (a spool) is made on the surface, in each case fabricated to fit the distance between the hubs provided at the end of the pipelines. A termination head is normally fitted to each end of the spool. There are two main methods for the installation of such spools. In vertical installation, so-called stab-and-hinge method, the spool is deployed vertically and fitted into a receiver on the installation. Thereafter the spool is rotated to a horizontal position and the first (hinge) end is connected up with the piping hub on the first installation (commonly called the inboard hub), and then the second end is connected. An example of this method is disclosed in NO Patent No. 319639.

In horizontal installation the spool is suspended from a carrier frame in a horizontally position and both ends are landed simultaneously in the receiving sections of the installations. Then the termination head is pulled towards the inboard hub and the connection is made up. See for example FIGS. 13 and 14 in PCT application WO 0179736.

Vertical installations can impose heavy loads on the seabed structures as they are landed and rotated. There is also a need for guiding structures to ensure correct alignment before the connection is made up.

WO 0179736 describes a horizontal connection where a support frame, or cradle, is coupled to each termination head. The cradle includes a collar that lands on the inboard hub. The termination head is now in the correct alignment for connection and can now be moved towards the inboard hub, by using an ROV tool. The disadvantage with this system is that it is complicated and that the whole weight of the spool will rest (through the collar) on the inboard hub.

SUMMARY OF THE INVENTION

The present invention is an improvement on this system, having fewer parts and is much simpler to operate. Instead of using a special ROV tool to move the termination head towards the inboard hub (as the one shown in FIG. 5 in WO 0179736), a simple stroking tool such as a cylinder and piston, for instance hydraulic or screw cylinder can be used. This can be operated by simpler tools carried by the ROV.

The operations may be carried out by an ROV-manipulator with tools retrieved from a subsea basket. It is therefore not necessary to have the tie-in tool fixedly mounted underneath the ROV, such as shown in WO 0179736. This will reduce the interface work against the installation contractor and the ROV will be much more operable. No loose items other than the ROV-tool basket(s) need to be deployed and brought back on deck. All ROV-tools can therefore be made simple to "understand" and to operate. This low user threshold can reduce the education and training requirement of the vessel crew. The tool logistics can therefore be simple particularly regarding world wide operations, i.e. the simple tooling is not required to be taken back to the manufacturer for refurbishment and storage, but can be managed by the project locally. The system design is intended to cover all relevant pipeline dimensions, especially the standard 12" ID insulated pipe and up to 14" ID uninsulated pipes.

According to the invention the tool comprises means for connecting the pipelines, and a receiving portion provided to accommodate the end of the first pipeline in a slideable manner, and guiding means comprising at least two guiding sections extending from receiving portion, each guiding section having an end arranged with an attachment portion interfacing with the guiding sections.

The receiving portion may be provided by a sleeve for instance having a U-shape. The guiding sections may be provided with support elements. The first pipeline may be provided with first anchoring means and the second pipeline may be provided with second anchoring means and that a stroking tool comprising means for displacement is to be mounted between the anchoring means. The stroking tool may comprise a piston and cylinder, having fastening means at their ends for attaching to the anchoring means. The sleeve may have a slot for interfacing with the second anchoring means. A connector may be provided for connecting the two ends of the pipelines, wherein the connector comprises a clamp connector and that a torque tool is used to operate the connector. The connector may comprise a collet connector and that an actuating tool is mounted onto the pipeline end to operate the collet fingers to close the connection.

In accordance with a first embodiment of the tool, the guiding sections may be provided as protruding arms, wherein each protruding arm terminates in the attachment portion shaped as a funnel. The guide elements may then be shaped as conical stopping elements.

In accordance with a second embodiment of the tool the guiding sections are provided as protruding arms, wherein each protruding arm terminates in the attachment portion provided as a locking element, wherein the locking element may be shaped as a guiding pin. The guide elements may then each be provided with a recess for the accommodation of the locking element. The recess may be provided with an entry portion. The entry portion may be arranged for guiding the locking elements into the recess and for acting as a support surface for the support elements, wherein the support element may be shaped as a pin.

The method according to the invention comprises: lowering the first pipeline to the subsea structure and guiding means arranged on the first pipeline interacting with the guide elements, attaching a stroking tool between the two pipelines to enable the first pipe end to be moved toward second pipe end, and providing an actuator to close the connection. The guiding means arranged on the first pipeline may be included in the tool as defined in the independent tool claim. The first pipeline may be lowered using a lifting frame. The stroking tool and/or the actuator may be operated by an ROV.

BRIEF DESCRIPTION OF THE DRAWINGS

The invention will now be described with reference to the accompanying drawings where.

DETAILED DESCRIPTION OF THE INVENTION

Figure 1:
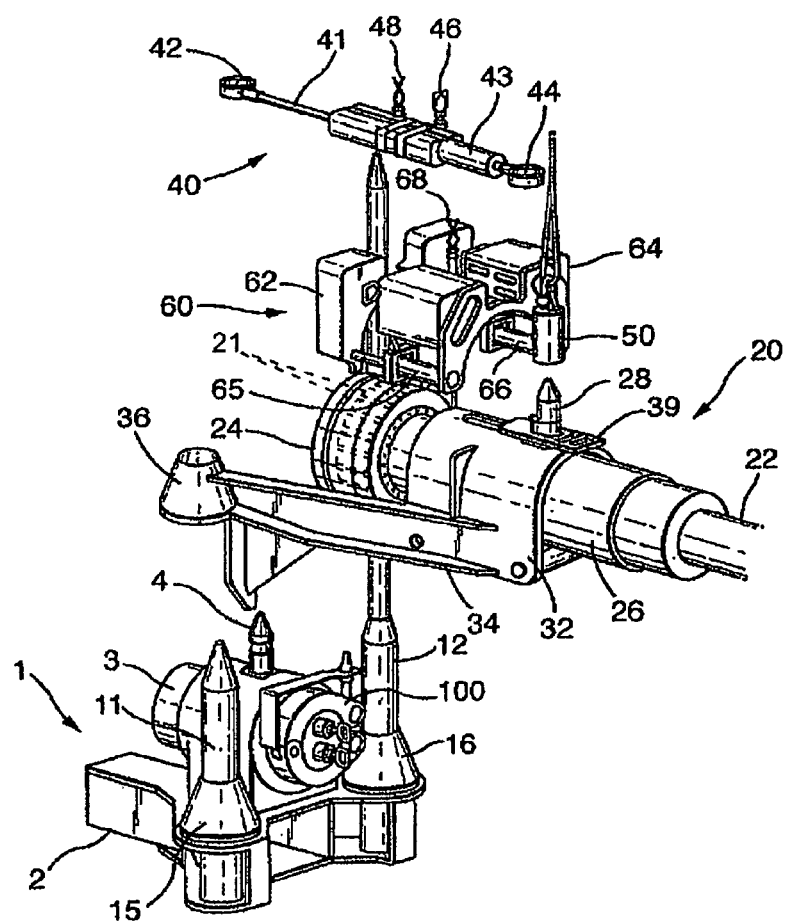
FIG. 1 is a drawing showing the tie-in tool assembly according to the invention.
Figure 2:
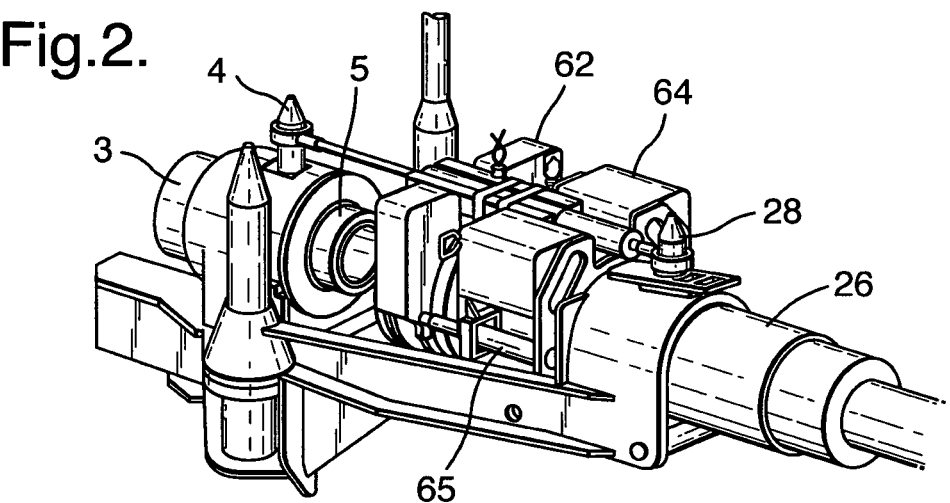
FIGS. 2-5 show the steps of the installation process.
Figure 3:
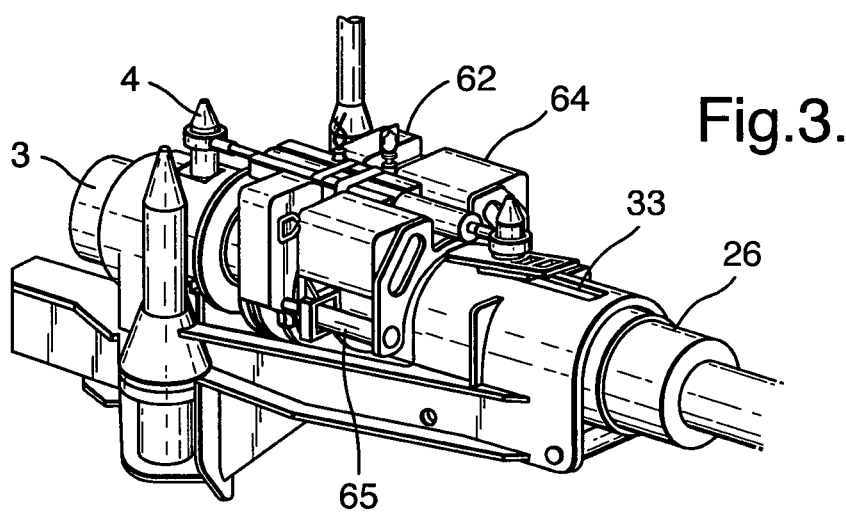

FIG. 1 is an assembly drawing showing the tools and structures used in the tie-in system for the connection of two pipe line (spool) ends, which may be provided with hubs. A seabed structure 1 comprises a frame 2 that supports a pipe 3 shown with a hub end 5 (FIG. 2). The pipe may be insulated as shown on FIG. 1. This hub end is normally termed an inboard hub. Anchoring means 4 such as an anchoring pin is attached to the inboard hub 5, protruding upwards. Also supported by the frame 2 are guide elements 11, 12, here shown as guide posts located at each side of the inboard hub. Each guide element (post) 11, 12 extend upwards and terminate in a point. At their base they have a portion 15, 16 that acts as supports. Their function will be described later. In the embodiment of FIG. 1 they are shown as conical mounts, but they may also be formed as plates or other structures providing support to the guide elements, preferably by being provided as an enlarged cross section area. In the embodiment shown on FIG. 1 one guide post is longer than the other. This aids the guiding process and enables the guide rings to be rotated and aligned with the guide post.

In the embodiment shown in the figures the pipeline 22 has a termination head 20 attached to its end. In the following the invention is described with the termination head 20 attached to the pipe end, but as the skilled person will realize, the following descriptions will also apply to embodiments of the invention wherein no termination head is used, either where the termination head is replaced with an element suitable for the field of use or the pipe end is applicable without an additional element. The tie-in assembly may be used both for a clamp connector and a collet connector. In FIG. 1 there is shown a collect connector with the collet fingers 21 (shown in phantom) arranged at the front of the termination head 20. In this case the connector will comprise an actuating ring 24 and an actuating tool 60 will be used to stroke the collet fingers 21 to close the connector. In the case of the connector being a clamp, the clamp 100 will normally be pre-installed on the hub, as illustrated in FIG. 1.

The termination has a part 26 with an even diameter and a relatively smooth surface. On this part, protruding upwards, there is mounted first anchoring means 28 such as an anchoring pin.

Figure 6:
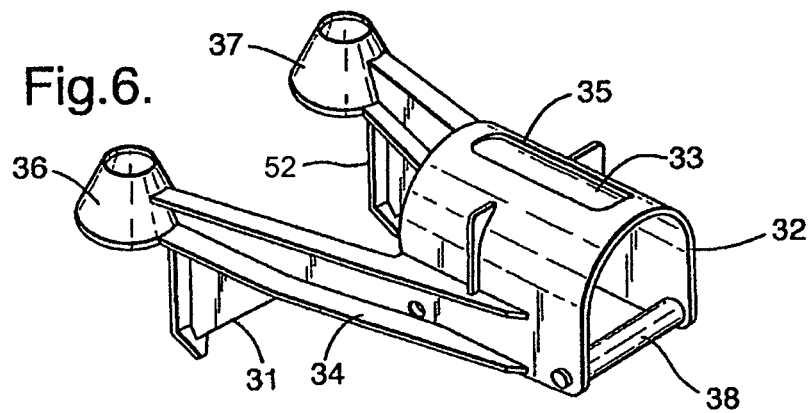
FIGS. 6-7 show the mounting arms in more detail.
Figure 7:
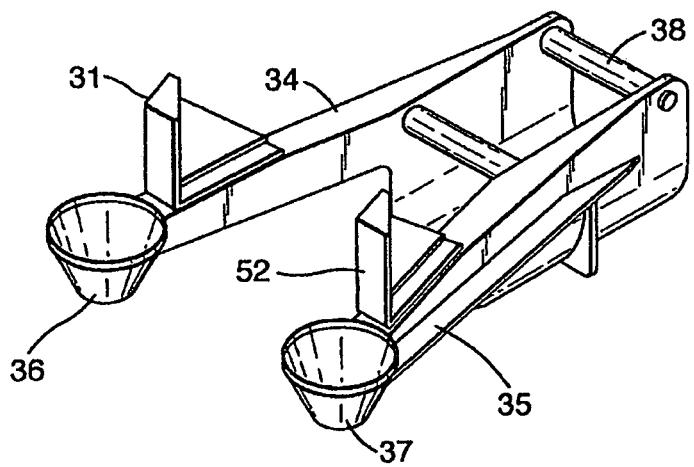
Figure 8:
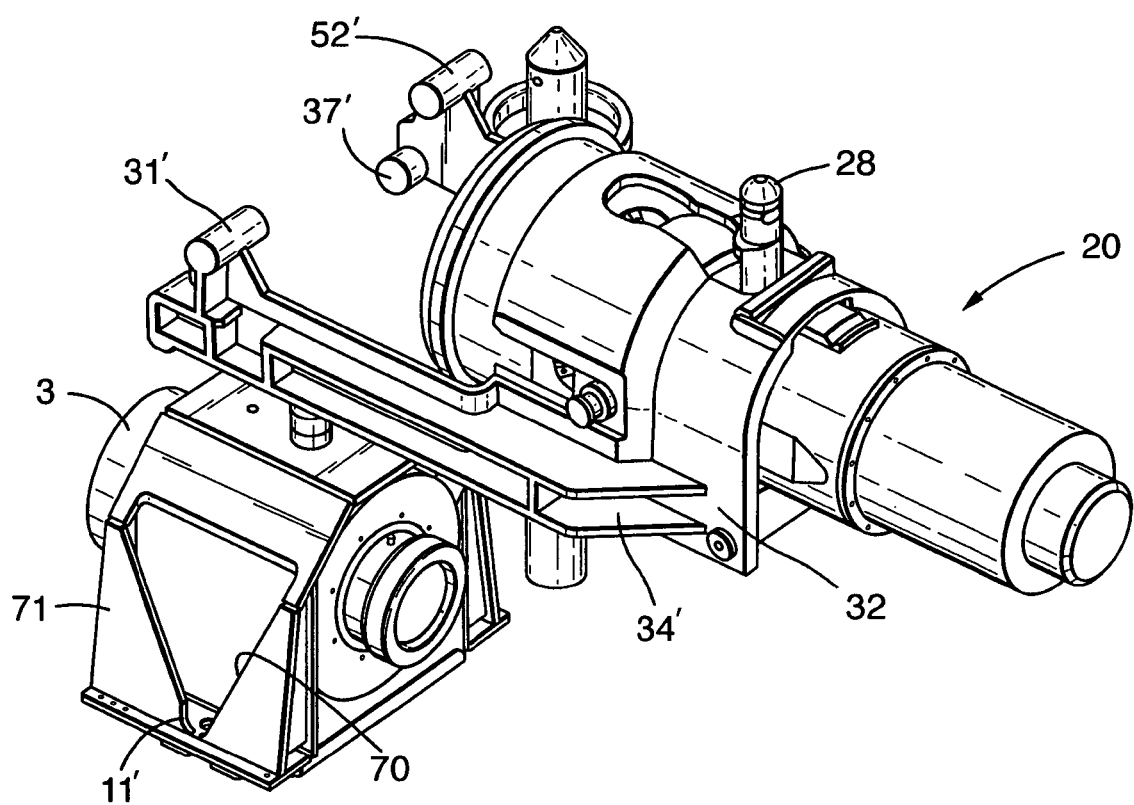
FIGS. 8-9 show an alternative embodiment of the mounting arms.
Figure 9:
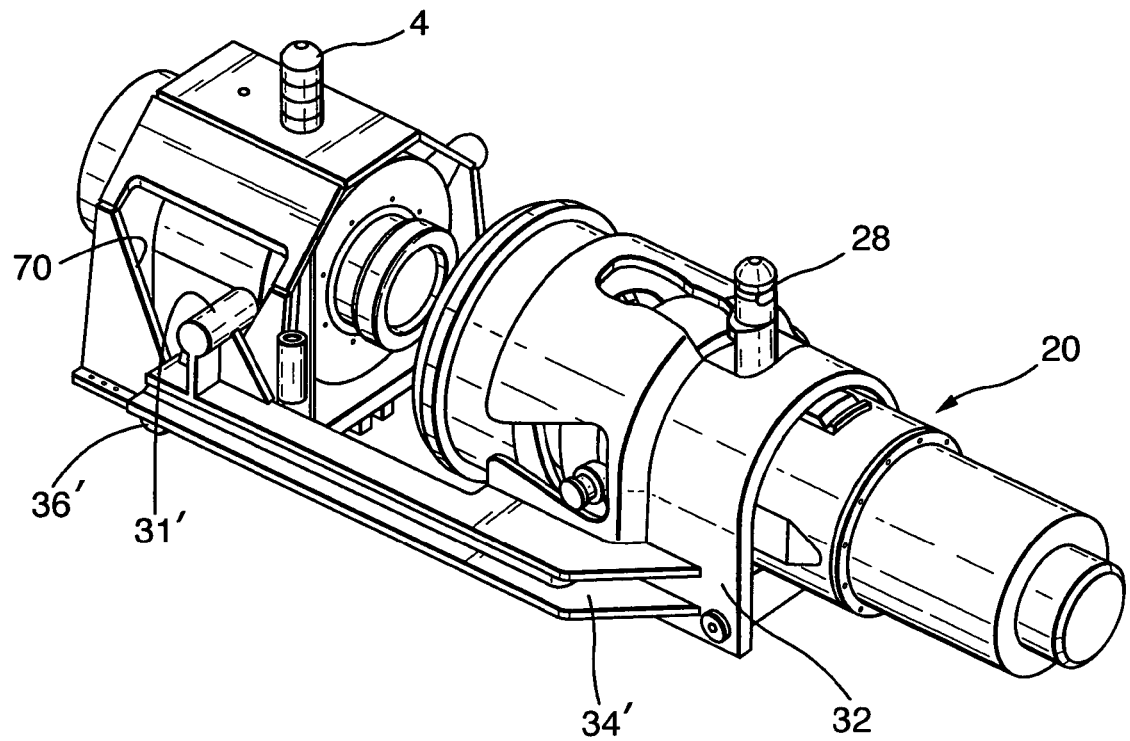
Figure 10:
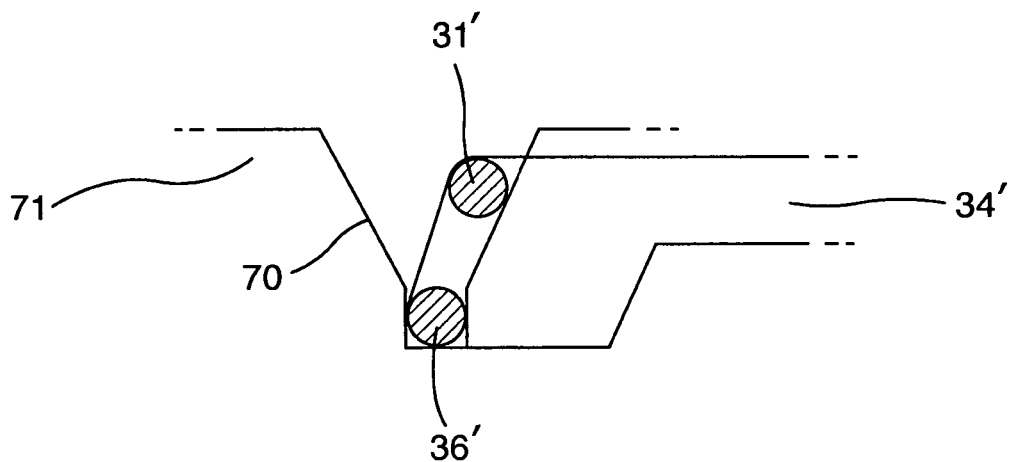
FIG. 10 shows a detail of the alternative embodiment of FIGS. 8-9.

The tool here shown as a mounting arm (see also FIGS. 6 and 7) comprises a receiving portion 32 which may be arranged as a sleeve section and two guiding and alignment sections 34, 35, here provided as protruding arms. Each protruding arm terminates in an attachment portion 36, 37 for instance shaped as a funnel designed to interface with the guide elements (posts) 11, 12 and, when mounted, rest against the supports 15, 16, in the figures shown as conical stopping elements. A slot 33 is arranged on the sleeve section, having a longitudinal direction aligned with the termination head axis. Also, the sleeve section 32 is of a U-shape with the U of an inner diameter that is adapted to the outer diameter of termination head part 26 or the pipe end, and linearly moveably in relation to the part 26 or the pipe end. A locking arm may be used to enable the sleeve to be closed around the termination head. This will enable the mounting arm to be released and retrieved back to the vessel after the tie-in operation has been completed. However, in the preferred embodiment, struts 38 are arranged across the opening of the U to support the termination head, and a plate 39 attached to the pin making up the anchoring means. 28 holds the sleeve section 32 so that the tool/mounting arm may move in relation to the termination head but remain attached to the termination head, as is seen on FIG. 1. On each guiding section (arm), just behind the funnels, there may be support elements. 31, 52 for instance provided as fixed brackets being designed to rest against the frame 2 to support the weight of the termination head on the frame.

A stroking tool 40 is provided to induce relative movement between the ends of the first and second pipeline 22, 3. In the figures the stroking tool 40 is shown as a cylinder, for instance a hydraulic cylinder, comprising a rod 41 and cylinder 43. The rod has fastening means 42 such as a ring at its end for mounting it to the second anchoring means 4, shown as a pin. Likewise, the cylinder 43 has fastening means 44 at its end for mounting it to the first anchoring means 28 shown as a pin. The tool is operated by the use of a ROV tool having means for supplying pressurized fluid for instance hydraulic fluid to the actuator 40, through coupling 48. Although a hydraulic cylinder is shown in the figures, it is obvious that other kinds of devices may be used to the same effect, for example a screw and nut mechanism.

In the event that the connector is a collet connector, an actuator 60 will be mounted onto the termination head (or pipeline end), as shown on FIGS. 1-6. The actuator comprises a first part 62 that is designed to grip around the collet head 24 and a second part 64 that is designed to grip around the termination head (or pipeline end), and is supported from moving by resting against a sleeve part 35. The two parts are interconnected by cylinders 65, 66 for instance hydraulic cylinders enabling the first part to move in relation to the second part by using a pressurized fluid supplied from the ROV through coupling 68. When moving the first part 62 it will move the collet ring 24 forward and in this way close the collet fingers around the hub 2.

It will be obvious to a man skilled in the art that in the case of the connector being a clamp a different kind of actuator will be used.

When installing the spool, a lifting frame (see the aforementioned WO 0179736) is attached to the spool. At the end shown in FIG. 1 the first anchoring means (pin) 28 may be used with a lifting hook 50 releasable coupled to the pin. There will be a number of such lifting hooks distributed along the length of the spool, as shown in WO 0179736. The spool is lowered horizontally such that the attachment portion 37, here shown as a guide funnel, is guided onto guide elements 12. To ensure correct guiding the spool can now be rotated so that the other attachment portion 36, here shown as a guide funnel, is guided onto guide element 11. The same procedure is done at the other end of the spool. The spool is now lowered further until the arms constituting the guiding sections 34, 36 rest on the supports 15, 16. The pipeline end is now in the position shown in FIG. 2. The support elements 31; 52 provided as brackets rests against the frame 2 such that they support the guiding sections 34, 36 to lessen the bending load on the supports 15, 16. With the spool resting on the support the lifting hooks (such as 50) are released. An ROV first fetches the actuator 60, usually from a basket arranged beforehand on the seabed, and mounts this onto the termination head. Next, the ROV fetches the stroking tool 40 and fixes the ends 42,44 on the anchoring means (pins) 4 and 28 respectively (FIG. 2). The ROV will now be used to operate the stroking tool to pull the termination head 22 towards the pipeline 3/inboard hub 5. Normally this operation will stop when the hubs are a small distance from each other, enabling the ROV to use a tool to clean the hub ends and to install a gasket. When this is done the stroking tool is again operated to bring the two hubs into close engagement, resulting in the situation shown in FIG. 3. The actuator 60 is then used to close the connection, see FIG. 4. In the embodiment shown, when the connector is a collet connector having fingers that grip around the inboard hub, the tool is used to move the collet ring 24 forward to close the fingers around the inboard hub.

In the case of the connector being a clamp connector the ROV will use a torque tool to close the clamp around the hubs, as shown in NO 319639.

After the connection has been made up, the actuating tool and the stroking tool is detached from the pipe and used for the second end connection. This results in the situation shown in FIG. 5. The only items left subsea are now the connector itself, all other items will be retrieved to the surface and used again.

It will be obvious to a man skilled in the art that the invention also may be used in a vertical connection. In this case, the attachment portions 36, 37 (funnels) may for example be arranged at a 90° angle to the guiding sections (arms) 34, 35, thus enabling the attachment portions (funnels) to slide down along the guide elements 11, 12 and maintaining the correct orientation of the termination head in relation to the hub.

Figure 11:
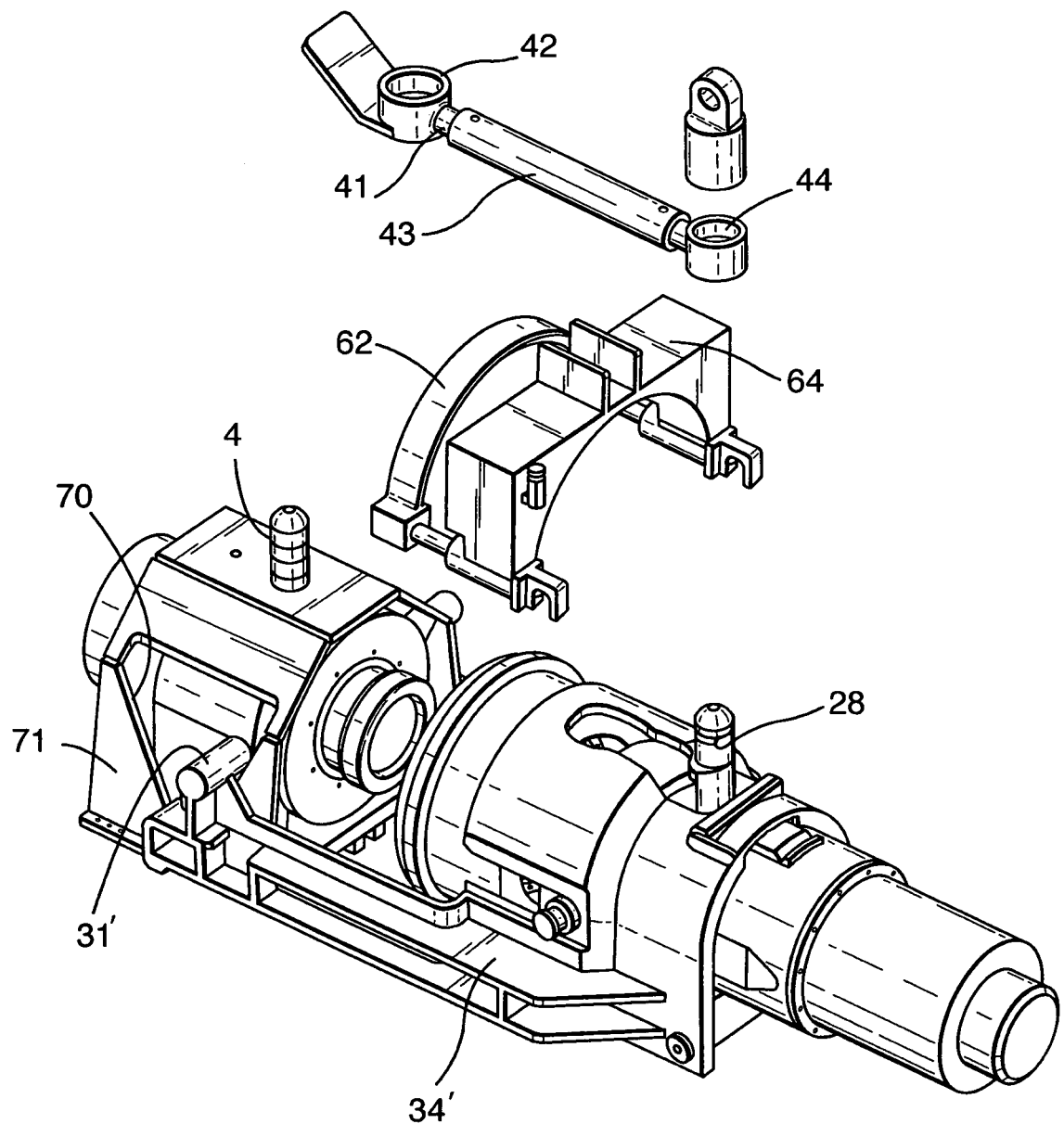
FIGS. 11-12 show the tie-in tool assembly with the alternative embodiment of the mounting arms.

FIGS. 8-12 show an alternative embodiment for guiding and aligning the termination head 20 towards the hub. In this embodiment the guiding sections 34', 35' of the mounting arm comprises an end portion having guiding and alignment pins 36', 37'. The pins are arranged to interface with guide elements 11, 12 that are shaped as converging inclines terminating in a recesses 11', 12'. The mounting arms also comprises support pins 31', 52' also arranged at the end of the protruding arms in the area but located above the guiding pins 36', 37'. The support pins will support the termination head in a horizontal position in the same manner as the anchoring means 28 shown in FIG. 2. To obtain an engagement between the termination head and the inboard hub, the guiding sections 34', 35' are initially placed in a position with the guiding pins 36', 37' at an entry portion 70. By further lowering of the termination head, the pins 36', 37' will be brought into contact with the inclined surfaces of the entry portion 70 as shown in FIG. 11. Further downwards movement of the termination head brings the guiding pins 36', 37' into engagement with each respective recess 11', 12'. The guiding pin 36'; 37' is brought into engagement with the recess 11', 12' to be held in a fixed position due to the interaction between the shape and dimensions of the guiding pin 36',37' and the recess 11', 12', see FIGS. 9 and 10. The support pin 31', 52' rests against the inclined surfaces of the entry portion 70 to support the weight of the termination head positioned in the receiving portion 32. The recess 11', 12' and the entry portion 70 are part of a sleeve shaped section 71 which may be held in place by anchoring means 4 protruding through a corresponding hole in the sleeve shaped section 71. However, the sleeve may also be fixed to the hub by bolts or welded.

Figure 12:
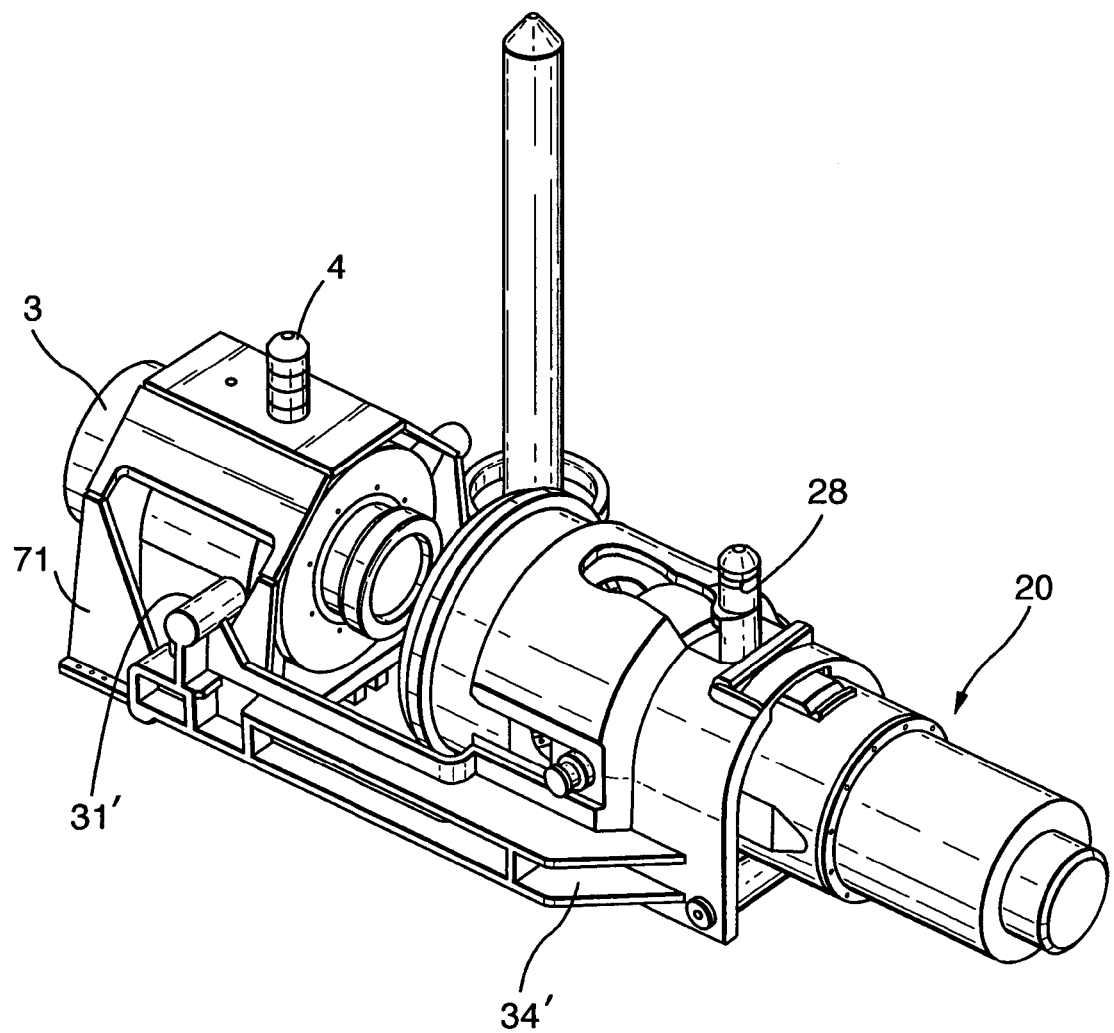

FIGS. 11 and 12 show the components making up the tool. The components having features common with the tool in accordance with the first embodiment of the invention are shown with the same reference numbers. Even though the shape of the first part 62 and the second part 64 of the actuator 60 differs from those shown in FIG. 1, these parts work according to the same principles.

The guiding pin 36', 37' may be provided by various elements arranged to fit into the accommodation of the recesses 11', 12', wherein the interaction between the guiding pin 36', 37' and the recesses 11', 12' make sure that a stable connection is achieved between these elements. The guiding pin 36', 37' as shown in the illustration of FIGS. 8-11 is shaped as a pin with a cylindrical form. The axial direction (the length) of the cylindrical element is positioned in a direction transverse to the axial direction (the length) of the projecting arm with the circular cross section of the cylindrical element positioned into the recess 11', 12'. Of course other pin elements than the ones having a circular cross section, or elements having a form different from the shape of a pin element may be fitted to be received in recess, and further the shape and size of the recess may also vary in accordance with the field of use.

In accordance with the example shown in the illustration, the support pin 31', 52' has a shape similar to that of the guiding pin 36', 37'. The support pin 31' 52' and the guiding pin 36',37' may of course be provided by similar or different elements.

The support pin 31', 52' for the support of the pipe element positioned in the receiving portion 32, and configured to be inserted into the entry portion, may of course be produced by other elements than the ones shown in the FIGS. 8-11, provided that the purpose of the support pin 31', 52' is fulfilled.

The tool in accordance with the invention is provided so that the various components making up the tool may be put together depending on the application of the tool. In one aspect of the tool, at least one of a guiding section, a guide element, a stroking tool or an actuating tool is included in the tool. The components are releasably connected to the pipeline(s), preferably for the purpose of reuse.

Figure 4:
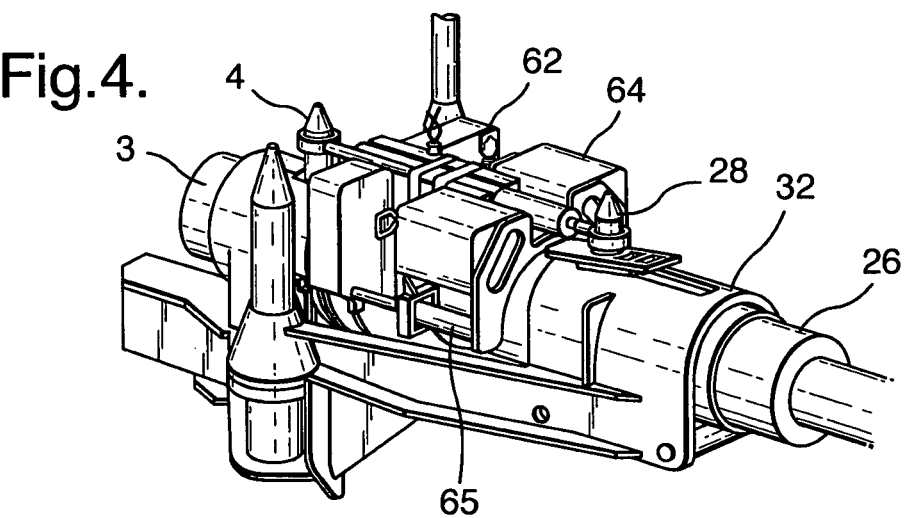
Figure 5:
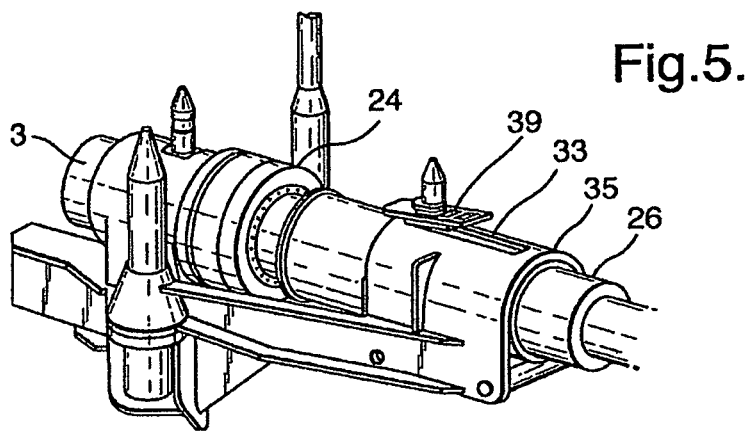

In the case of the connector being a collet connector, the actuator 60 is used for moving the fingers, and then the stroking tool 40 is placed onto the tool for closing the connection, see FIG. 4. In the case of the connector being a clamp connector, the actuator 60 is made redundant and the stroking tool 40 is placed onto the tool for the closing of the connection. The actuator 60 and the stroking tool 40 may be stored for instance in a basket, and a ROV may be employed for fetching the equipment when needed depending on the various demands of the connection to be made. The components of the tool in accordance with the invention are provided to be released when the pipe connection is completed. The components may then be retrieved and are ready for reuse. The guiding sections 34, 35, 34', 35' will normally be mounted to the pipeline prior to submerging, and then released from the pipeline after the connection is made, the guiding sections are then ready for reuse in another application.

The invention is described with reference to a pipeline but it may also be used for connecting up an umbilical, a fluid line or an electrical cable.

The invention claimed is:

1. A tool for connecting an end of a pipeline to a hub end of a pipe, said hub end being supported by a subsea structure, said subsea structure having at least two guide elements and said hub end being fixed in position relative to the guide elements, the tool comprising:
    a mounting arm having a receiving portion which is slidably secured to the end of the pipeline and two guiding sections which are directly connected to the receiving portion, each guiding section comprising an attachment portion which is releasably engageable with a corresponding guide element to thereby secure the mounting arm in a fixed position relative to the hub end, and
    a stroking tool having a first end which is releasably connectable to a first anchoring member that is fixed in position relative to the hub end and a second end which is releasably connectable to a second anchoring member that is fixed in position relative to the pipeline, wherein activation of the stroking tool moves the end of the pipeline relative to the mounting arm and into engagement with the hub end.

2. A tool according to claim 1, wherein the receiving portion comprises a sleeve which is configured to conform to the end of the pipeline.

3. A tool according to claim 1, wherein each of the guiding sections comprises a support element which engages the subsea structure.

4. A tool according to claim 1, wherein each of the guiding sections comprises a protruding arm which terminates in the attachment portion, and wherein the attachment portion is shaped as a funnel.

5. A tool according to claim 4, wherein the guide elements are shaped as conical stopping elements.

6. A tool according to claim 1, wherein each of the guiding sections comprises a protruding arm which terminates in the attachment portion, and wherein the attachment portion comprises a locking element.

7. A tool according to claim 6, wherein each of the guide elements comprises a recess within which the locking element is received.

8. A tool according to claim 7, wherein each recess comprises an entry portion.

9. A tool according to claim 8, wherein each guiding section comprises a support element and each entry portion guides the locking element into the recess and provides a support surface for a corresponding support element.

10. A tool according to claim 6, wherein at least one of the locking element and the support element is pin-shaped.

11. A tool according to claim 1, wherein the stroking tool comprises a piston and cylinder and means for attaching the piston and cylinder to the first and second anchoring members.

12. A tool according to claim 2, wherein the sleeve has a longitudinal slot through which the second anchoring member protrudes.

13. A tool according to claim 1, wherein the end of the pipeline is connected to the hub end of the pipe with a clamp connector and the tool further comprises a torque tool for operating the clamp connector.

14. A tool according to claim 1, wherein the end of the pipeline is connected to the hub end of the pipe with a collet connector which comprises a number of collet fingers and the tool further comprises an actuating tool mounted on the end of the pipeline for closing the collet fingers.

15. A tool according to claim 1, further comprising an actuating tool for closing a connector which connects the end of the pipeline to the hub end of the pipe, and wherein at least one of the mounting arm, the guide elements, the stroking tool and the actuating tool is releasably connected to the pipeline.

16. A method for connecting an end of a pipeline to a hub end of a pipe, said hub end being supported by a subsea structure, said subsea structure having at least two guide elements and said hub end being fixed in position relative to the guide elements, the method comprising:

providing a connector for connecting the end of the pipeline to the hub end, movably securing a mounting arm to the end of the pipeline, the mounting arm comprising at least two attachment portions which are configured to releasably engage the guide elements, lowering the pipeline to the subsea structure until the attachment portions engage the guide elements to thereby secure the mounting arm in a fixed position relative to the hub end, releasably attaching a stroking tool between a first anchoring means on the first pipeline and a second anchoring means on the hub end, operating the stroking tool to move the end of the pipeline relative to the mounting arm toward the hub end, and closing the connector to thereby secure the pipeline to the hub end.

17. Method according to claim 16, wherein the pipeline is lowered using a lifting frame.

18. Method according to claim 16 wherein the stroking tool is operated by an ROV.

19. Method according to claim 16, wherein the closing step is performed by an actuator which is operated by an ROV.

20. Method according to claim 16, wherein the mounting arm is slidably supported on the pipeline and the step of operating the stroking tool moves the end of the pipeline toward the hub end relative to the mounting arm.

* * * * *